United States Patent [19]

Kossat et al.

[11] Patent Number: 5,424,831
[45] Date of Patent: Jun. 13, 1995

[54] METHOD AND APPARATUS FOR MEASURING A PLURALITY OF LIGHT WAVEGUIDES

[75] Inventors: Rainer Kossat, Aschau; Winfried Lieber, Offenburg; Manfred Loch; Gervin Ruegenberg, both of Munich, all of Germany

[73] Assignee: Siemens Aktiengesellschaft, Munich, Germany

[21] Appl. No.: 99,941

[22] Filed: Jul. 30, 1993

[30] Foreign Application Priority Data

Jul. 30, 1992 [DE] Germany .................. 42 25 239.3

[51] Int. Cl.⁶ .................. G01N 21/59; G01N 21/84
[52] U.S. Cl. .................. 356/73.1; 250/227.21
[58] Field of Search ........... 356/73.1; 250/227.21, 250/227.26

[56] References Cited

U.S. PATENT DOCUMENTS

| | | | |
|---|---|---|---|
| 4,498,004 | 2/1985 | Adolfsson et al. | 250/227.21 |
| 4,534,615 | 8/1985 | Iwasaki . | |
| 5,040,866 | 8/1991 | Engel . | |
| 5,090,802 | 2/1992 | Longhurst | 356/73.1 |

FOREIGN PATENT DOCUMENTS

| | | | |
|---|---|---|---|
| 0411956A2 | 2/1991 | European Pat. Off. | 356/73.1 |
| 0421657 | 4/1991 | European Pat. Off. . | |
| 0485629 | 5/1992 | European Pat. Off. . | |
| 57-44831 | 3/1982 | Japan | 356/73.1 |
| 58-18614 | 2/1983 | Japan | 356/73.1 |
| 58-198015 | 11/1983 | Japan | 356/73.1 |
| 2-234043 | 9/1990 | Japan | 356/73.1 |

OTHER PUBLICATIONS

Hotchkiss "Automated Loss Measurement Set for Optical Cables" Electronics Test, vol. 29 #13, Jun. 1981, pp. 32–33.

*Primary Examiner*—Vincent P. McGraw
*Attorney, Agent, or Firm*—Hill, Steadman & Simpson

[57] ABSTRACT

An apparatus for performing measurements on a plurality of light waveguides comprises an arrangement for coupling distinguishably fed optical signals into each of the waveguides and measuring each of the distinguishable signals from the waveguides by using flexural couplers. In one embodiment, the distinguishable signals are obtained by utilizing modulated signals of different modulations, or different frequencies. In another embodiment, the signals are sequentially applied in a chronological order to the waveguides and are separately evaluated.

35 Claims, 5 Drawing Sheets

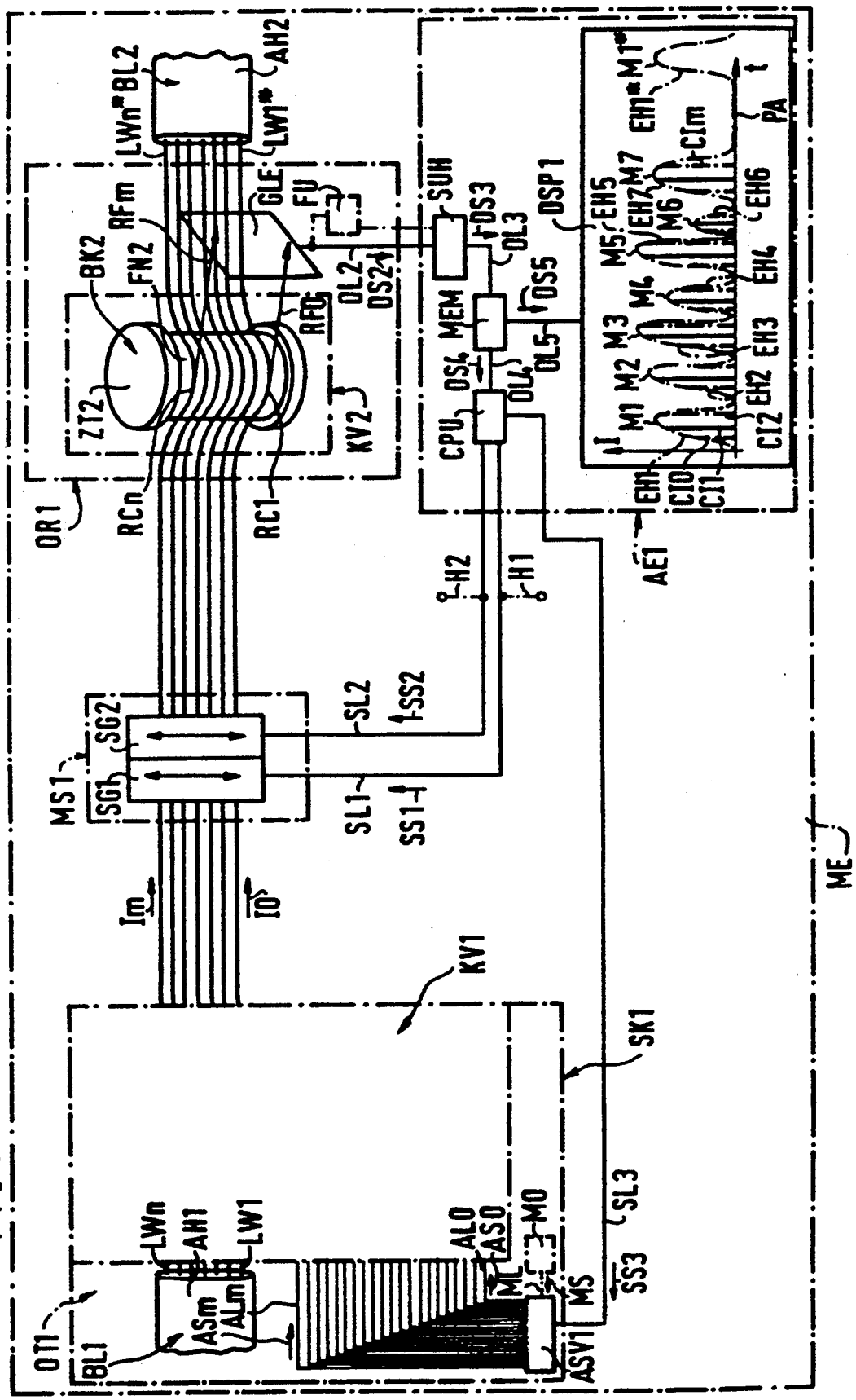

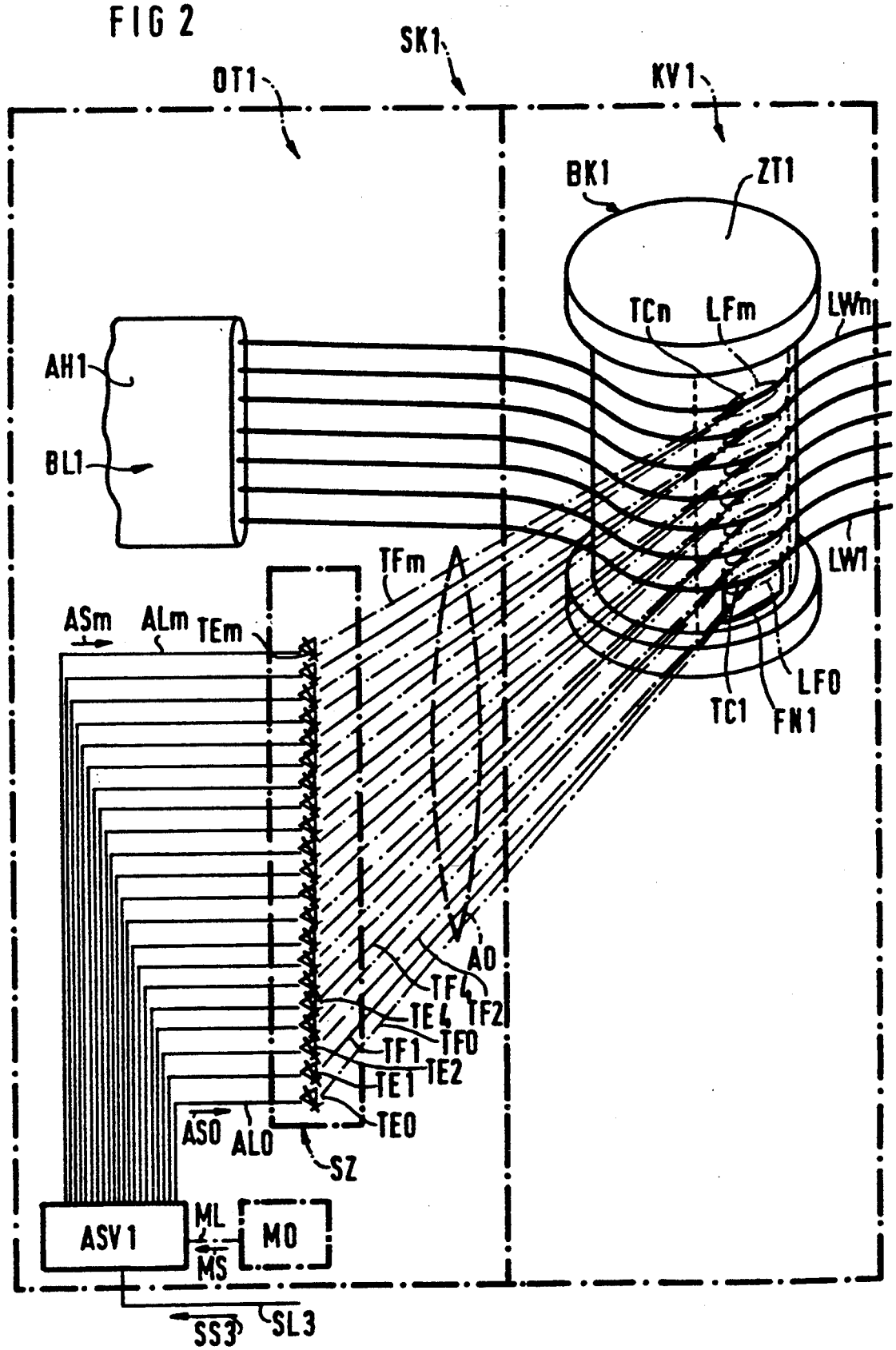

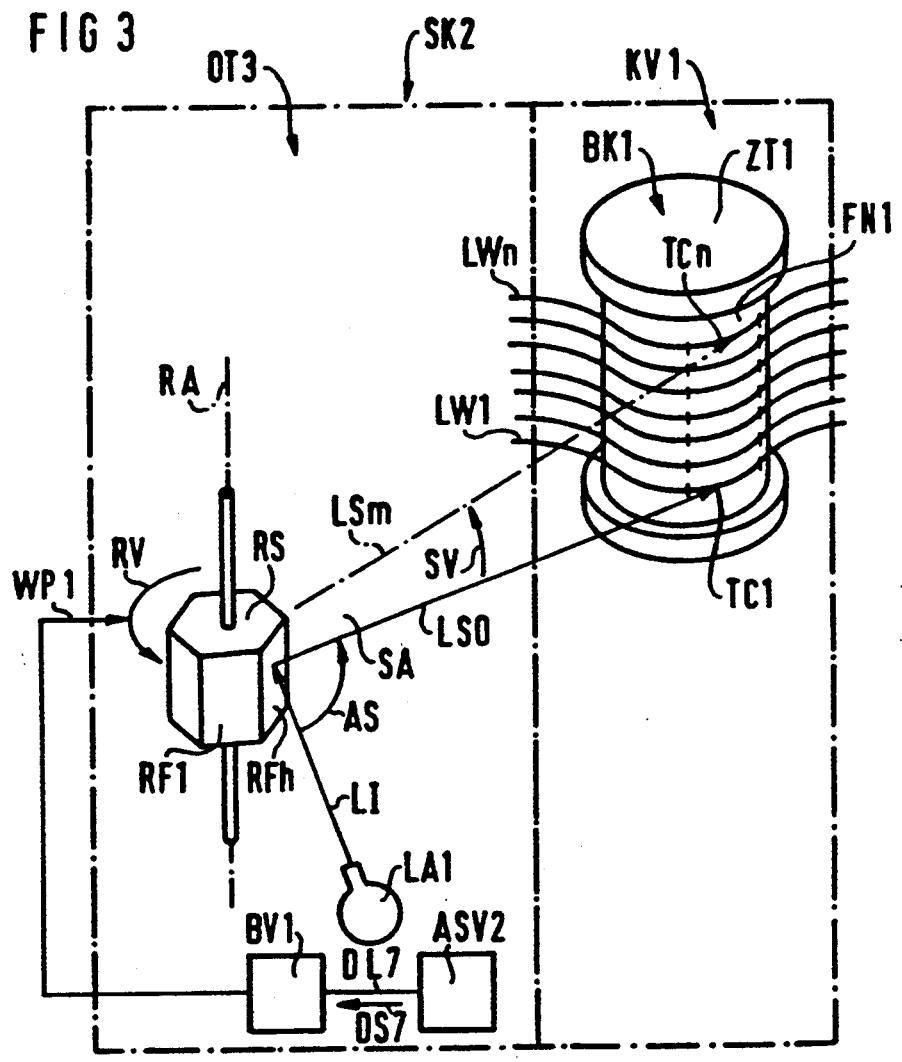

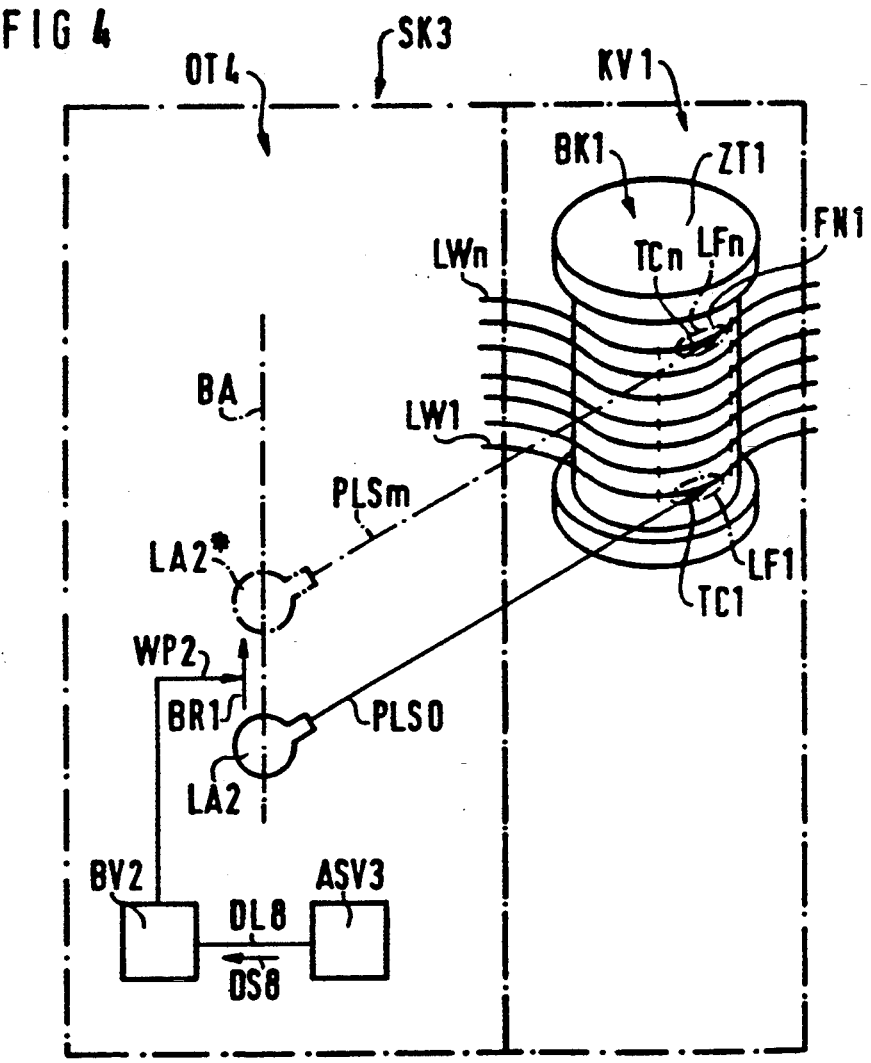

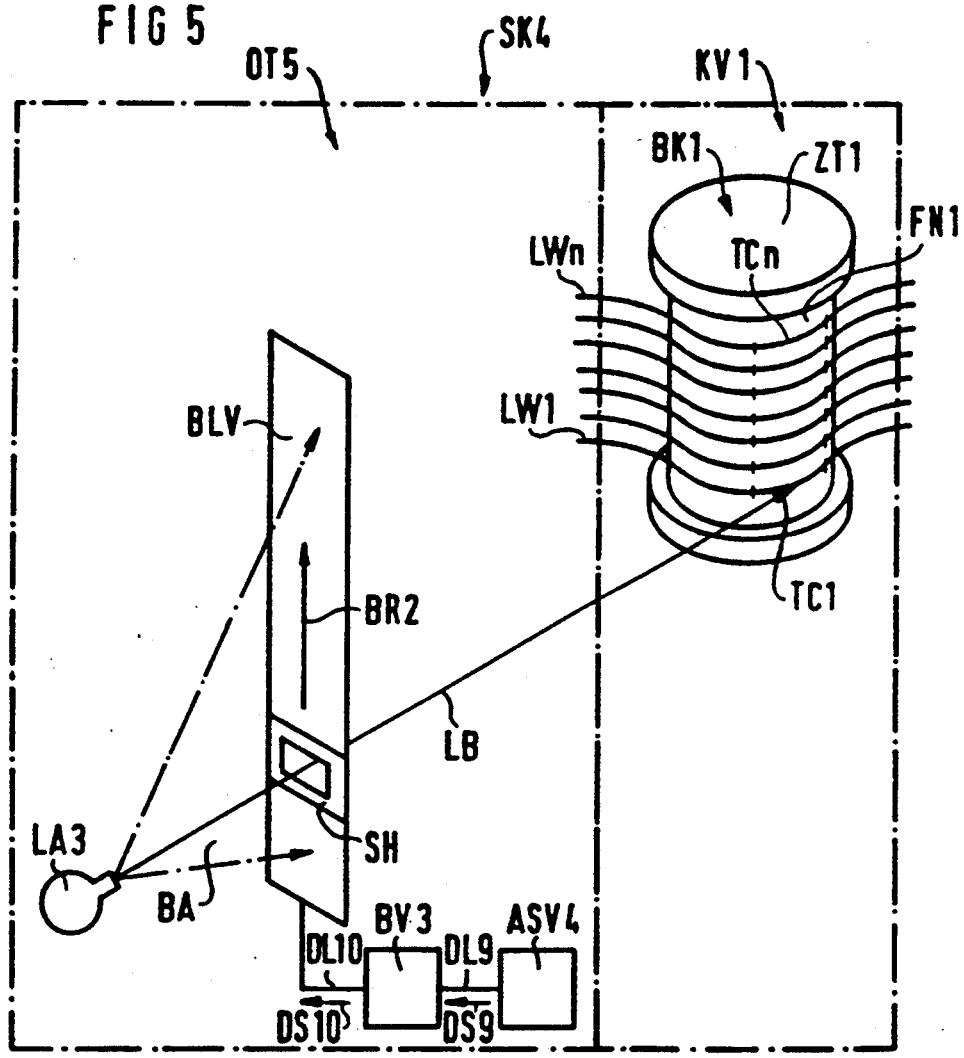

5,424,831

METHOD AND APPARATUS FOR MEASURING A PLURALITY OF LIGHT WAVEGUIDES

BACKGROUND OF THE INVENTION

The present invention is directed to an apparatus for measurement of a plurality of light waveguides, which apparatus comprises an optical transmitter that can be coupled via a coupling device into the light waveguides to be respectively measured, as well as has an optical receiver which provides a signal to an evaluation means.

A measuring instrument for measuring a plurality of light waveguides is disclosed in U.S. Pat. No. 5,090,802, whose disclosure is incorporated herein by reference thereto and which claims priority from the same British Application as Published European Application 0 411 956 A2. In this patent, the measuring instrument includes an optical switch via whose transmission channels respectively one of two light sources having different wavelengths can be individually coupled at their end faces into a plurality of light waveguides in chronological succession. The light waveguides are, thus, respectively, permanently spliced to the transmission channels of the optical switch. For evaluating a multi-fiber junction in the course of the path of these light waveguides, an optical receiver having a reception element, which is preferably a large-area detector for all light waveguides to be measured, is provided at the reception side. A test signal is, respectively, individually and sequentially supplied into the light waveguide connected to the transmission channels of the optical switch at the transmission side and is picked up at the reception side with the reception element and is separately evaluated. A variable, separable coupling or, respectively, uncoupling of the light waveguides is relatively difficult to accomplish, since the light waveguides to be measured are spliced, i.e., permanently connected to the transmission channels of the optical switch.

A separation of the spliced connections already existing would be respectively required, first for coupling new light waveguides to be measured. The light waveguides would then have to respectively have their end or open end face spliced to the output of the optical switch. This known measuring instrument could, thus, hardly be used for a flexible, destruction-free coupling or, respectively, uncoupling of the respective light sources as desired, for example, in optical transmission links having light waveguide ribbons for checking multiple spliced connections.

U.S. Pat. No. 5,040,66, whose disclosure is incorporated herein by reference thereto and which claims priority from German Application P 34 29 947, discloses a measuring instrument for evaluating a splice of an individual light waveguide. The transmission signal is supplied into the light waveguide before the splice with the assistance of a flexural coupler and is coupled out at the reception side following the splice with a second flexural coupler. The exit field of the outfed transmission signal is received by a photodiode and is subsequently displayed. If one were to place a plurality of light waveguides into this known measuring instrument, then it would, at most, be the simple sum of the individual, infed radiation fields of the light waveguides that could be measured. The statements and conclusions about individual optical transmission characteristics of the individual light waveguides derive from this superposition sum are not possible within the known measuring instrument, since a functional dependency between the individual, optical measured values cannot be derived from this sum.

SUMMARY OF THE INVENTION

An object of the present invention is to create a measuring instrument with whose assistance optical transmission characteristics of a plurality of light waveguides can be selectively registered in a simple and reliable way.

This object is obtained by an improvement in an apparatus for measurement of a plurality of light waveguides comprising an optical transmitter means that can be respectively coupled via a coupling device to the light waveguides to be respectively measured, as well as has an optical receiver means that comprises at least one reception element to which an evaluation means is connected. The improvements are that the optical transmitter means is arranged and constructed to create a distinguishable separate radiation field for each light waveguide in a coupling region of the coupling device, that each respective transmission radiation field can have its luminous spot distinguishably fed into the light waveguide along a respective infeed section of the light waveguide and that the reception element in the optical receiver is aligned and constructed so that the reception element acquires the reception radiation field of the light waveguides to be measured and generates distinguishable measured signals therefrom, and that these measured signals are separately evaluated in the evaluation means connected to this reception element.

The invention quite substantially improves the possibility for selective identification and evaluation of optical transmission characteristics of a plurality of light waveguides. If n individual measurements were to be successively implemented for n light waveguides, the invention requires the known measuring instrument with only a single transmission element and only a single reception element and the invention requires only a single, common coupling element. Given the selective identification of the optical transmission characteristics per light waveguide, this will lead both to a reduction in the work outlay as well as the saving of the work time.

The selective measurement of the optical transmission characteristics is also quite simple and flexible, particularly in that the infeed of the distinguishable transmission radiation fields into the light waveguide to be measured is implemented in common for all waveguides according to the flexural coupler principle. What is thereby avoided in comparison to known measuring instruments having the optical switch is that in the prior art device the light waveguides to be measured, particularly a light waveguide ribbon, must be parted proceeding a multiple splice to be investigated in order to be able to be individually supplied the transmission radiation fields into their open end faces. The flexural coupler as a coupling device, on the contrary, makes it especially advantageously possible that the transmission radiation fields can be non-destructively and selectively coupled into the light waveguides to be measured in a simple way at a freely-selectable infeed location along the light waveguide. The coupling or, respectively, uncoupling of the optical transmitter can thereby be rapidly implemented in succession.

Given free accessibility of the open end faces of the light waveguides to be measured, of course, a direct infeed of the transmission signals at the transmission side without flexural coupler is also possible in the method of the present invention. Measured information that can be identical to those given an infeed according to the flexural coupler principle at the transmission side are, thus, available at the reception side.

According to the first, expedient development of the invention, distinguishable transmission radiation fields from at least one transmission element can be selectively fed into the light waveguide to be measured in that the luminous spots sweep the infeed sections or, respectively, regions of the light waveguide to be measured in a chronological succession in the coupling region. When the plurality of transmission elements is smaller than the plurality of light waveguides to be measured, then it can be expedient to allow the respective transmission radiation field of at least one transmission element to sweep over the infeed region of the light waveguide in a chronological succession with the assistance of a variable beam deflection means. For example, the motion of the transmission radiation field can be implemented in a mechanical way with the assistance of a rotary mirror, so that the light is deflected in the direction onto the light waveguides to be measured in chronological succession and, thus, distinguishably and is coupled therein. A beam deflection is also advantageously possible with electro/acousto-optical means, such as, for example, with acousto-optical modulators. The diaphragm device having a mechanically movable slotted diaphragm or having an electro-optical diaphragm, such as, for example, a liquid crystal shutter, can just as advantageously be provided for the sequential infeed of the transmission radiation field onto selected waveguides.

When the plurality of transmission elements of the optical transmitter is equal to the plurality of light waveguides in the coupling region to be measured, the transmission elements are advantageously allocated to the infeed section of the curved light waveguides in an unambiguous way and are aligned to them as exactly as possible. In that, for example, the transmission elements are driven in chronological succession in a time-division multiplex mode, this transmission radiation field or, respectively, this luminous spot can be sequentially supplied in this way into the light waveguides to be measured in the fashion of a through-connected "light chain". The optical transmission characteristics can then be selectively measured with particular exactness for every light waveguide.

A great plurality of transmission elements in the optical transmitter can also be expediently allocated to the light waveguides to be measured in the coupling region of the coupling device. A time-division multiplex mode of the transmission elements thereby advantageously assures that the infeed section of the light waveguides to be measured are illuminated with high topical resolution, i.e., finer and, in particular, the local power distribution of the light waveguides can thereby be exactly registered and offered for further evaluation. Thus, in this case, the optical transmission characteristics can be exactly selectively measured with even better resolution when compared to the two other cited instances. Compared to the above-recited instance wherein the plurality of transmission elements is equal to the plurality of light waveguides, an exact, unambiguous alignment or, respectively, allocation of the transmission radiation fields onto the infeed section or, respectively, regions of the light waveguides to be measured is no longer necessary.

According to another, expedient development of the invention, a modulation means can be provided for generating distinguishable transmission radiation fields or work can be carried out with different transmission frequencies. This offers the advantage that distinguishable transmission radiation fields can be simultaneously coupled into the infeed section of the light waveguides to be measured.

The invention is also directed to a method for measuring optical transmission characteristics of light waveguides, whereby the optical transmitter for the infeed of test signals is coupled to the respective light waveguides to be measured, whereby the infed test signals are coupled out and registered in an optical receiver with the assistance of at least one reception element and wherein the outfed test signals are evaluated in an allocated evaluation means, with the improvements being the illumination spot of a respective transmission radiation field is being distinguishably supplied to the light waveguides in the optical transmitter along a respective infeed section of the light waveguides, in that reception radiation fields of the light waveguides to be measured are required and an optical receiver with the assistance of the reception element and distinguishably measured signals are generated therefrom, and in that these measured signals are separately evaluated in the evaluation means connected to the reception element.

Other advantages and features of the invention will be readily apparent from the following description of the preferred embodiments, the drawings and claims.

BRIEF DESCRIPTION OF THE DRAWINGS

FIG. 1 is a partial perspective illustration of a schematic overall structure of an optical instrument in accordance with the present invention;

FIG. 2 is a detail schematic illustration with perspective illustrations of the transmission side structure of the measuring instrument of FIG. 1;

FIG. 3 is an enlarged schematic illustration of a first modification of the optical transmitter of FIG. 1;

FIG. 4 is a detailed, second exemplary embodiment of the optical transmitter of FIG. 1; and FIG. 5 is a schematic illustration of a third exemplary embodiment of the optical transmitter for the device of FIG. 1.

DESCRIPTION OF THE PREFERRED EMBODIMENTS

The principles of the present invention are particularly useful when incorporated in a measuring instrument ME illustrated in FIG. 1. The measuring instrument ME includes a transmission coupling means SK1 having an optical transmitter means OT1 together with a coupling device KV1 for the infeed means of the instrument. The instrument ME also includes a multiple splice means MS1, an optical receiver means OR1 and an evaluation means AE1. These components can be expediently combined to form the measuring apparatus, particularly a portable box-type measuring instrument. However, it can also advantageously be a component part of a light waveguide splicing device or of a light waveguide attenuation measurement device. In addition to this especially advantageous area of employment for the invention, the invention also enables the selective identification of further optical transmission characteristics, such as, for example, the phase delays, pulse responses, line attenuations, etc. The splice attenuation of the light waveguides shall be respectively described in the following exemplary embodiments.

In FIG. 1, a ribbon conductor BL1 having light waveguides LW1 through LWn and a second ribbon conductor BL2 having light waveguides LW1* through LWn* are to be spliced together opposite one another in an multiple splicing means MS1. The light waveguides LW1 through LWn are embedded nearly parallel to one another in a flat, approximately rectangular outer envelope AH1 of a plastic material of the ribbon conductor BL1. This outer envelope AH1 is only indicated in the left-hand part of FIG. 1 and has been omitted in the rest of the drawings for the sake of clarity. Corresponding thereto, the light waveguides LW1* through LWn* of the ribbon conductor BL2 are arranged side-by-side approximately parallel and mechanically connected to one another in an outer envelope AH2 that is likewise approximately rectangular. Again for the sake of clarity, the outer envelope AH2 of the ribbon conductor BL2 has only been shown in the right-hand part of FIG. 1 and has otherwise been omitted.

In order to couple the optical transmitter means OT1 to the light waveguides LW1 through LWn of the ribbon conductor BL1 in the left-hand part of FIG. 1 with a coupling device KV1, the light waveguides LW1 through LWn, as may be seen in FIG. 2, are placed approximately arcuately around a cylinder bending block ZT1 of a flexural coupler BK1. To enable securing the position of the ribbon conductor BL1 and for guiding the ribbon conductor BL1 on the cylindrical bending block ZT1, the circumference of the bending block ZT1 of the flexural coupler BK1 comprises a guide channel FN1, whose width roughly corresponds to the width of the ribbon conductor BL1 which is to be placed thereon.

In order to be able to supply selectively distinguishable test signals l0 through lm (FIG. 1) into the light waveguides LW1 through LWn, the optical transmitter means OT1 comprises transmission elements TE0 through TEm (FIG. 2) that can output transmission radiation fields TF0 through TFm in the direction onto the light waveguides LW1 through LWn, which have been held in a curved path in the coupling region of the flexural coupler BK1. The transmission elements TE0 through TEm are arranged in the optical transmitter means OT1 in a transmission line SZ framed with dot-dash lines that extend on the left-hand side of the flexural coupler BK1 in the proximity of the coupling region thereof with equal light waveguides LW1 through LWn proceeding in the curve transversely relative to one another along the longitudinal axis of the ribbon conductor BL1. The arrangement of the transmission elements TE0 through TEm is, thus, matched to a particular extent to the structured arrangement of the light waveguides LW1 through LWn to be measured in the coupler BK1. In addition, it can also be expedient to combine the transmission elements TE0 through TEm in an array or transmitter field. Laser diodes are advantageously suitable as transmission elements TE0 through TEm, and these are expediently combined in the form of a line or, respectively, of an array, for example an array sold by Epitaxx Company. Individual laser diodes or LEDs can also be expediently employed as transmission elements TE0 through TEm.

The transmission elements TE0 through TEm in the transmission line SZ are activated in chronological succession by a drive means ASV1 on the basis of control signals AS0 through ASm that are transmitted on control lines AL0 through ALm. The transmission elements TE0 through TEm are, thus, driven in time-division multiplex mode, wherein they generate chronologically distinguishable transmission radiation fields TF0 through TFm. Their selective infeed along a respective infeed section or, respectively, infeed region TC1 through TCn of the light waveguides LW1 through LWn proceeds arcuately thereat is achieved by a corresponding arrangement and alignment of the transmission elements TE0 through TEm of the transmission lines SZ. The transmission radiation fields TF0 through TFm thereby enter nearly tangentially into the infeed sections TC1 through TCn. The sequential infeed of the test signals l0 through lm (FIG. 1) by the radiation fields TF0 through TFm can, for example, be started with the activation of the first transmission element TE0 (FIG. 2). The drive means ASV1 then activates all other transmission elements TE1 through TEm in the transmission line SZ in chronological succession. In this way, the radiation fields TF0 through TFm illuminate the infeed sections TC1 through TCn of the curved light waveguides LW1 through LWn successively in steps with their oval luminous spots LF0 through LFm indicated in dot-dash lines. All transmission radiation fields are thereby preferably aligned parallel so that, for example, given their chronological successively occurring "firing" in identical chronological spacings, the resultant luminous spot migrates along a line from, for example, below (beginning at the infeed section TC1) and extending toward the top ending at the infeed section TCn.

The luminous spots LF0 through LFm each, respectively, preferably comprise an axial expanse in the direction of the longitudinal axis of the light waveguides LW1 through LWn along the respective infeed stations TC1 through TCn that is selected at least equal to half the thickness of the light waveguide ribbon, for example generally at least 200 μm. Their width transversely relative to the longitudinal direction of the light waveguides LW1 through LWn to be measured is selected smaller than the spacing between the longitudinal axes of two neighboring light waveguides. What is thereby assured is that every luminous spot LF0 through LFm respectively feeds light into only one of the light waveguides LW1 through LWn and not into a plurality of light waveguides. Every transmission element TE0 through TEm, thus, generates a luminous spot LF0 through LFm that is unambiguously allocated to a respective one specific light waveguide LW1 through LWn. It can already be adequate for the selective identification of the optical transmission characteristics of the light waveguides LW1 through LWn for the drive means or device ASV1 to activate the chain of transmission elements TE0 through TEm only once. It can be expedient for a farther-reaching, more precise measurement that the drive means ASV1 triggers a "light chain" that is to be repeatedly traversed. The drive means or device ASV1 can expediently identify every pass, for example on the basis of an appropriately large pause or on the basis of a special signal.

There are the following possibilities with respect to the number n of light waveguides LW1 through LWn within the ribbon BL1 and with respect to the number m of transmission elements TE0 through TEm. These are:

a) m>n;
b) m=n; and
C) m<R.

The exemplary embodiment of FIG. 2 shows the case a), wherein there are more transmission elements TE0 through TEm than there are light waveguides LW1 through LWn. In other words, m>n. It is assumed for this applied example that, respectively, three successive transmission elements are allocated to each light waveguide. For example, the transmission elements TE0, TE1 and TE2 are allocated to the waveguide LW1. Thus, the radiation fields TF0 through TF2 generated by the transmission elements TE0 through TE2 generate luminous spots LF0 through LF2 that are spatially disposed so that they only produce an infeed into the light waveguide LW1. By contrast, the next neighboring light waveguide LW2 is not charged by the radiation fields of the transmission elements TE1 through TE2. As a consequence of the somewhat different spatial arrangement of the transmission elements TE0 through TE2, the luminous spots LF0 through LF2 generated by the radiation fields TF0 through TF2 are, of course, somewhat different in reality, however, they coincide for the most part. Only one luminous spot LF0 is, therefore, shown in the region of the infeed section TC1 of the light waveguide LW1, and this luminous spot LF0 being roughly shared in common by the three radiation fields TF0 through TF2. The spatial shift of the different, individual luminous spots present in reality is always insignificant as long as the infeed into the neighboring, next light waveguide LW2 does not occur as a consequence of the radiation fields TF0 through TF2.

It is expedient to select the number of transmission elements m according to their relationship m=kn, wherein k is a whole number. In the present example, k=3 has been selected, for example three transmission elements TE0 through TE2 illuminate one light waveguide LW1.

The obtainable resolution is all the greater with a greater plurality of transmission elements. On the one hand, the outlay at the transmission side also increases with a greater plurality of transmission elements so that their number should not be selected unnecessarily high.

It is also possible within the framework of the invention to respectively allocate a different number of transmission elements or, respectively, radiation fields derived therefrom to individual light waveguides. For example, one could proceed wherein the transmission elements TE0 through TE2, and, thus, their radiation fields TF0 through TF2, are allocated to the light waveguide LW1, whereas the next light waveguide LW2 is charged, for example, by the radiation field of the following four transmission elements. The result thereof would be that three respective signals are received and offered for evaluation in a "pass" in the first light waveguide and four reception signals are received and offered for evaluation for the second light waveguide LW2. In any case, care should be exercised to see that the allocation of the transmission elements on the one hand to the individual light waveguides on the other hand is and remains unambiguous and reproducible.

Given a correspondingly high topical resolution at the transmission side, for example with m>>n, finally, an exact, unambiguous alignment or, respectively, allocation of the transmission radiation field TF0 through TFm onto the infeed sections TC1 through TCn of the curved light waveguides LW1 through LWn is no longer required.

In case b), wherein m=n, only, respectively, one transmission element would be allocated to exactly one light waveguide in the present example. The transmission radiation fields indicated with dot-dash lines would, thus, be respectively eliminated, and what this would mean for the light waveguide LW1 is that the transmission element TE0 and the transmission element TE2 are omitted and, consequently, so are the radiation fields TF0 and TF2 indicated in dot-dash lines. Respectively, one radiation field, for example TF1, of one transmission element, for example TE1, will illuminate exactly one light waveguide LW1. Since there is no longer any redundancy with respect to a light waveguide in view of the "illumination" by radiation fields, the allocation and alignment of the transmission elements must be undertaken with optimum exactness in order to be able to implement an unambiguous and reliable measurement here.

The case c), wherein the number of transmission elements is selected lower than the number of the light waveguides, i.e., m<n, shall be set forth in greater detail together with its effects and the appertaining background with reference to FIGS. 3–5. Intellectually, one can also image this type of infeed of test signal at the transmission side in conjunction with the arrangement of FIG. 2, wherein the transmission element, for example TE2, is designated such that the radiation field generated by it impinges both the light waveguide LW1 as well as the light waveguide LW2. The evaluation of the measured signal then selectively occurs at the reception side, i.e., five reception signals from the light waveguide LW1 are, first, successively evaluated and, subsequently, the next five reception signals from the light waveguide LW2 are successively evaluated given, for example, ten transmission pulses that follow one another.

The coupling conditions at the transmission side can be advantageously improved in that optical aids, such as, for example, lenses or light waveguides, are interposed between the transmission elements TE0 through TEm and the optical transmitter OT1 and the light waveguides LW1 through LWn. In FIG. 2, an optical lens AO is entered in broken lines by way of an example. The greater spacing between the transmission elements TE0 through TEm and the infeed sections TC1 through TCn of the light waveguides LW1 through LWn can be advantageously overcome on the basis of this measure, for example a distance as can, for example, be prescribed by a housing that surrounds the transmission elements TE0 through TEm. The optical aids thus form the transmission radiation fields TF0 through TFm onto the infeed sections TC1 through TCn that are directly "fired".

In order to prevent an undesirable overcoupling between neighboring radiation fields TF0 through TFm, lateral diaphragms can be expediently inserted between the transmission elements TE0 through TEm and their transmission fields TF0 through TFm.

In FIG. 1, the infeed test signals 10 through 1m proceed through the light waveguides LW1 through LWn to be measured and across the multiple splice means MS1 to the reception side. A part of the signals are outfed in approximately tangential direction thereat in a second coupling element KV2, which is constructed analogous to the coupling element KV1 and is a second flexural coupler BK2. The outfed or decoupled signals are received by an optical receiver OR1. To this end, the light waveguides LW1* through LWn* of the second ribbon conductor BL2 are placed in a curved path around a cylinder ZT2 in a guide channel FN2 analogous to the transmission side. As a result thereof, reception radiation fields RF0 through RFm, respectively, are coupled out of the coupling region of the flexural coupler BK2 along outfeed sections RC1 through RCn of the arcuately guided light waveguides LW1* through LWn*. Since the transmission elements TE0 through TEm are activated in chronological succession in the example under consideration, the radiation fields RF0 through RFm appear in a corresponding chronological sequence. They are, therefore, respectively, completely picked up in chronological succession, i.e., sequentially by a common light sensitive element GLE of the receiver means, which element will convert the signals into respective electrical measured signals DS2 and transmit them via a line DL2 to a digitizing element SUH of an evaluation means AE1. The digitizing element SUH undertakes a sampling and digitization of the electrical measured signal DS2 arriving in chronological succession in short time intervals and transmits the digitized measured signals DS2 on a line DL3 to a measured value memory MEM of the evaluation means AE1. The digitized measured data can be forwarded from this measured value memory MEM as a signal DS5 on a line DL5 to a display means DSP1, for example display of the evaluation means AE1. Thus, the signals can be visually displayed on the display means DSP1.

The outfeed of the reception radiation field via the open end faces of the waveguides LW1 through LWn to be measured, which are accessible at the output side, is also possible for evaluating the measured signals l0 through lm. The flexural coupler BK2 is then eliminated whereas the other components of the optical receiver OR1 work in the same way as set forth above.

Although it is completely adequate for a selective, distinguishable pickup of the reception radiation field to provide a single, large-area reception element GLE in common for all light waveguides to be measured, it can also be advantageous to attach a plurality of reception elements, particularly in a line or an array form instead of the common element GLE. For example, traditional photodiodes, CCD elements, diode arrays, CID elements, diode lines, etc., are suitable as reception elements.

The picture in the display means DSP1 exhibits an intensity or, respectively, power distribution l over the time axis t as it occurs given a sequential infeed of the radiation fields TF0 through TFm from FIG. 2 of the transmission elements TE0 through TEm. The light infeed thereby begins with light waveguide LW1 and ends with light waveguide LWn, wherein n=7.

A possible intensity distribution l dependent on the time t in the display means DSP1 is shown for the case illustrated in FIG. 2, with m=kn, wherein k=3. Since, respectively, three transmission elements are allocated to one light waveguide in FIG. 2, a total of three reception signals also occur for each of the total of seven light waveguides when the chain of transmission elements SZ of FIG. 1 is traversed once like a "light chain". The same indices are thereby employed for these reception signals as for the transmission signals, for example the discrete reception value Cl0 corresponds to the transmission signal of the transmission element TE0 and the reception signal CE1 corresponds to the transmission signal of the transmission element TE1, and the reception signal Cl2 corresponds to the transmission signal of the transmission element TE2. Corresponding to the total of seven light waveguides provided, seven envelopes EH1 through EH7 will occur and each has, respectively, three discrete measured values, whereby the maximum of these envelopes is reference M1 through M7. After a defined chronological pause PA, the next series of measurements follow, and this again begins with the first light waveguide LW1, whereby the appertaining envelope is referenced EH1* with a maximum of M1*.

It is assumed as a simplification below that all the transmission elements TE0 through TEm in FIG. 2 output the same transmission level. If the individual luminous spots respectively allocated to the light waveguides were exactly identically aligned in spatial terms, i.e., were to coincide exactly, then three reception signals of the same size would, respectively, successively occur for a light waveguide. Due to the different, spatial configuration of the individual transmission elements, however, this alignment cannot be realized in practice, so that different reception signals are obtained at the reception side for the three transmission elements respectively allocated to a light waveguide. Within the envelope EH1, which is formed by the reception signals Cl0 through Cl2 allocated to the waveguide LW1, the reception signals Cl0 coming from TE0 is, thus, especially low, whereas the reception signal Cl1 coming from TE1 is significantly greater and the reception signal Cl2 coming from TE2 is the greatest. It can, thus, be said with respect to the allocation of luminous spots of the three transmission elements TE0 through TE2 that the luminous spots of the transmission element TE2 is coupled in with the highest coupling factor. There are two possibilities for this; namely, on the one hand, that the alignment of the transmission elements TE0 through TE2 with respect to the light waveguide LW1 is not ideal given an ideal alignment of the light waveguides within the light waveguide ribbon BL1. Given a non-ideal arrangement of the light waveguides in the ribbon BL1, but given an ideal arrangement of the transmission elements TE0 through TEm, by contrast, a conclusion can be drawn from the curve of the measured signals Cl0 through Cl2 established by the envelope EH1 that the light waveguide LW1 lies spatially shifted somewhat toward the top in the ribbon BL1 compared to its ideal position in the illustration of FIG. 1. This means that a statement about the exact or inexact positioning of the light waveguide within the ribbon BL1 can be made on the basis of the measured, individual reception signals per light waveguide given an extremely exact arrangement insuring with constant spacing of the transmission elements TE0 through TEm within the transmission line SZ. This, however, assumes that there are more transmission elements than light waveguides, for example that the following is valid:

$$m = kn, \text{ wherein } k > 1 \text{ and a whole number.}$$

A topical independence at the transmission side with respect to the radiation fields TF0 through TFm referred to the light waveguides, thus, practically occurs due to the illustrated, chronological resolution (successive activation of the transmission elements TE0 through TEm in the nature of a "light chain"). The radiation fields can, thus, be largely arbitrarily selected and need not lie in a specific, spatial allocation with respect to the cores of the light waveguide fibers. Due to the unavoidable tolerance with respect to the position of the cores of the light waveguide fibers, the latter is also hardly possible during practical operations. What is thereby critical is that, as already mentioned, k is always selected significantly larger than 1, preferably between 3 and 6. Due to the traversal of the "light chain" of the transmission side, the chronological resolution at the reception side thus corresponds to a topic resolution in view of the spatial position of the cores of the light waveguide fibers. An exact, unambiguous alignment or, respectively, allocation of the transmission radiation fields onto the infeed sections of the light waveguides is then no longer necessary at the transmission side. On the contrary, so much information without prior knowledge about the infeed conditions at the transmission side can be acquired ex post facto from the topical intensity distribution 1 that many-sides statements about every individual light waveguide, for example regarding its topical position, regarding its transmission characteristics, etc., can be selectively made in an unambiguous way. Thus, for example, the local maximums M1 through M7 of the intensity distribution 1 approximately identifies the position of the cores of the light waveguides LW1 through LWn with n=7. An automatic recognition of the plurality and of the exact position of the individual cores, i.e., a fiber identification, is thereby also possible. This is also true of an arbitrary arrangement of the fibers within the multi-fiber structure of the respective ribbon.

In addition to the "fine resolution" of the position of the cores of the light waveguide fibers, the invention also yields the further possibility of evaluating the quality of the alignment of the fiber ends in the region of the multiple splice means MS1. Given the simplifying assumption of identical transmission levels and ideal infeed, the curve of the envelopes EH1, EH2 and EH3, thus show that the appertaining light waveguide pairs LW1/LW1*, LW2/LW2* and LW3/LW3* are relatively well-aligned with respect to one another. The same is also true of the envelope EH5 having the light waveguide combination LW5/LW5* and with respect to the envelope EH7 with the light waveguide combination LW7/LW7*. The maximums M1, M2, M3, M5 and M7 of the envelopes EH1, EH2, EH3, EH5 and EH7, thus, lie above a tolerance or, respectively, threshold level that can be defined as the criterion for the acceptable splice result.

By contrast, the light waveguide combinations LW4/LW4* represented by the envelope EH4 and LW6/LW6* represented by the envelope EH6 both exhibit an extremely deficient alignment within the multiple splice means MS1. By observing the display means DSP1, the operator can, thus, decide without further ado whether a readjustment within the splicing means MS1 should be carried out or, respectively, whether a splice already carried out, for example by welding or fusion, must be implemented again, due to insufficient quality because of, for example, the envelopes EH4 and EH6 having their maximums M4 and M6 lying below the defined tolerance or acceptable level. Since the efficiency of the light infeed at the transmission side and of the outfeed at the reception side is generally different for the individual light waveguides and is not known, a statement about the alignment of the light waveguides residing opposite one another is generally difficult or not possible at all in a direct fashion. By dislocating the ends of the light waveguides upon simultaneous observation of the received intensity levels, given constant infeed at the transmission side, however, the information about the alignment of the light waveguide ends that corresponds to a relative measurement can be acquired.

For this reason, the transmitter and the receiver of FIG. 1 and the corresponding embodiments according to FIGS. 2 through 5 are expediently constructed so that, in particular, their transmission powers and their receiver sensitivities are designed such that the measuring instrument ME works for different colored individual fibers and, thus, for different coupling factors within the fiber ribbon. The different infeed and outfeed efficiencies for different light waveguides connected therewith lead to a different reception level.

Let it be reemphasized that, given $m>n$, particularly $m>>n$, the apparatus works independently of the exact position of the individual fibers within the respective structure and independently of the plurality of individual fibers. This is not valid for the case of $n=m$, wherein the plurality of light waveguides equals the plurality of transmission elements.

In this way, the apparatus is in the position to automatically recognize the exact position and the plurality of light waveguides. This is preferably true of $m>>n$ in the embodiment of FIG. 2 and quite particularly true of the following embodiments according to FIGS. 3 through 5.

When, by contrast, the number of transmission elements TE0 through TEm is selected equal to the number of light waveguides LW1 through LWn, i.e., when $m=n$ applies, then only one measured value occurs per light waveguide. Analogous to the example set forth in conjunction with FIG. 2, only the transmission element TE1 would be present for the light waveguide LW1 given, for example, omission of the transmission elements TE0 and TE2. This transmission element TE1 accordingly would, likewise, generate only one recognition signal or one reception signal Cl1 at the light waveguide LW1*. This reception signal Cl1 is shown in solid lines and referred to as Cl1 in the present example. This applies analogous to other light waveguides wherein the reception level, respectively indicated with solid lines, represents this one measured value that can then be obtained. It may be seen that an evaluation of the quality of the splicing event and the multiple splice means MS1 is still, in fact, possible on the basis of such a measurement. For example, one would find that the light waveguides LW4/LW4* and LW6/LW6* are not optimally aligned. However, an evaluation of the position of the individual light waveguides, particularly their core within the ribbon, for example an evaluation in view of symmetry or in view of greater tolerance deviations would not be possible or, respectively, would be far less informative.

The two ribbon conductors BL1 and BL2 can be shifted relative to one another and can be aligned to one another in the multiple splicing device MS1 in FIG. 1 with the assistance of two adjustment elements SG1 and SG2 as setting means. An operator can manually implement this with, for example, the assistance of two manual controls H1 and H2 shown in broken lines in FIG. 1. With the manual control H1, the operator can actuate the adjustment element SG1 with a control signal SS1 via a control line SL1. Corresponding thereto, the adjustment element SG2 can be displaced with the hand control H2 on the basis of the control signal SS2 on a control line SL2. Advantageously, a central processor unit CPU can also assume this alignment event. The central processor unit is connected by a line DL4 to the measured value memory MEM and receives a signal DS4 from the memory MEM, which signal will have the intensity distributions 1. The central processor unit will check whether all maximums M1 through M7 lie above the tolerance value and send signals on lines SL1 and SL2 to the elements SG1 and SG2. When all maximums M1 through M7 lie above the tolerance value, the central processor unit CPU will then stop the displacement event of the splicing means MS1 and also stop the infeed cycle in that it will transmit a control signal SS3 via a control line SL3 to the drive means ASV1 and instruct the latter to end the multiplex mode for the transmission elements TE0 through TEm.

The operation of the measuring apparatus ME was set forth above in time-division multiplex. Additionally or, in particular, independent thereof, the measuring apparatus ME of FIG. 1 can also be operated in a different way. For generating distinguishable transmission signals, it is supplemented by a modulation means MO in the optical transmitter OT1. This modulation means MO is shown in broken lines in FIG. 1 and is connected to the drive means ASV1 by a line ML. The modulation means MO controls the drive means ASV1 with a control signal MS so that the drive means ASV1 will simultaneously activate a plurality of or all transmission elements TE0 through TEm with the control signals AS0 through ASm. The transmission radiation fields thereof are, thus, simultaneously coupled with different modulation or, respectively, transmission frequencies in the light waveguides LW1 through LWn to be measured and not in time-division multiplex mode. For example, a separate frequency or modulation can be allocated to every transmission element TE0 through TEm, i.e., 21 different frequencies or modulations are required for the example of FIG. 2. Corresponding to the outfeed, optical intensities, the signal simultaneously captured by the reception element GE1 from all light waveguides now contains differently sized parts of the different frequencies or modulations of the transmission diodes. The individual levels are acquired therefrom with a filter unit (shown in broken lines) or with a demodulator FU, and these individual levels are then separately and selectively supplied to the digitization unit SUH and are further processed analogous to the evaluation which has already been set forth hereinabove. In the case of different transmission frequencies, FU can, for example, contain a corresponding plurality of different filters or, in the case of modulation, correspondingly different demodulators. Compared to pure time-division multiplex, this method offers the advantage that the measured values of all fibers can be simultaneously made available in parallel.

The elements introduced unmodified from FIGS. 1 and 2 are respectively provided with the same reference characters in FIGS. 3 through 5. FIGS. 3 through 5 show three additional possibilities of how distinguishable transmission radiation fields can be respectively coupled into the light waveguides to be measured and being coupled thereinto with transmission coupling devices of SK2 through SK4 as infeed means.

In FIG. 3, a transmission coupling means SK2 has only a single light source LA1, which is preferably a laser that is provided in the optical transmitter OT3. This laser LA1 directs a light ray Ll onto a mirror RS which rotates around a rotational axis RA. The rotational direction is indicated by the arrow RV. The rotating mirror RS comprises a plurality of preferably 10 to 60 reflecting faces RF1 through RFh, and this number is greater than the number of light waveguides. The light ray Ll impinges, for example, on the reflecting face RFh, as illustrated in FIG. 3, and is deflected by this face into the infeed section TC1 of the light waveguide LW1 with its deflected ray LS0. Due to the rotational motion of the reflecting face RFh, the deflection angle AS will change with respect to the stationary light source LA1 so that the light waveguides LW1 through LWn are successively illuminated with light rays LS0 through LSm in chronological succession. As a result of the beam deflection of the light ray Ll, the deflected rays LS0 through LSm will sweep an area SA and the swivel motion or angle of the reflected light rays LS0 through LSm is illustrated by an arrow SV in FIG. 3.

The rotational motion of the mirror RS can be expediently controlled with an actuation device BV1. The control over the rotational motion is thereby indicated with the assistance of an arrow WP1. The actuation device BV1 is operated via a drive mechanism ASV2, which provides a signal DS7 on a line DL7. Instead of the rotating mirror RS, a movable mirror can also be employed as a beam deflecting means. This expediently involves a periodic, linear motion or rotary motion. Coming into consideration as drive elements for this are, for example, self-resonance scanners (torque rod scanners, torque band scanners), galvanometer scanners and piezo-electric scanners. These elements have a different operating frequency range. Self-resonance scanners have a fixed frequency. The frequency is variable given galvanometer scanners and piezoelectric scanners. The elements also differ in terms of the wave representations with which a scanning is possible. The mechanical mirror motion that is susceptible to disruption can be advantageously avoided by employing an acousto-optical modulator as the deflection element.

Another optical transmitter OT4 is illustrated in FIG. 4 and, with the assistance of test signals, can be coupled into the infeed sections TC1 through TCn of the light waveguides LW1 through LWn of the ribbon conductor BL1 in chronological succession. To that end, a light source LA2 is shifted along a line BA with the assistance of an actuation means BV2 in the direction of an arrow BR1 transversely relative to the longitudinal axis of the stationary ribbon conductor BL1 or, respectively, its light waveguides LW1 through LWn. The displacement of the light source LA2 by the actuation means BV2 is indicated in FIG. 4 by the arrow WP2. The drive of the actuation means BV2 is assumed by a drive mechanism ASV3 with a control signal DS8 on a control line DL8. The light source LA2, preferably a laser diode or an LED element, successively couples light rays PLS0 through PLSm continuously into the infeed section TC1 through TCn of the light waveguides LW1 through LWn in chronological succession during a continuous displacement motion along the line BA in the direction of arrow BR1. The position of the light source at the end of the displacement motion is shown with broken lines in FIG. 4 as LA2*.

Instead of the displacement motion of the light source LA2 relative to the stationary ribbon BL1 in the flexural coupler BK1, an arbitrary relative motion between the ribbon conductor BL1 and the light source LA2 is also advantageously possible.

Another coupling device SK4 having an optical transmitter OT5 with a light source LA3 and an additional diaphragm means BLV is illustrated in FIG. 5. As diaphragm or, respectively, aperture, the diaphragm means BLV comprises a through slot or slotted diaphragm SH that can be displaced in the direction of BR2 transversely relative to the longitudinal axis of the ribbon conductor BL1, i.e., its light waveguides LW1 through LWn. As a result of this through slot SH, only, respectively, one narrow light ray LB from the broadarea radiation field BA of the light source LA3 can pass through. By way of example, FIG. 5 represents that moment during which the light ray LB illuminated the infeed section TC1 of the light waveguide LW1 and is supplied thereto. By contrast, all other light waveguides LW2 through LWn are shut off by the diaphragm means BLV. The slotted diaphragm SH is subsequently respectively displaced in chronological succession along the path indicated by the arrow BR2 and positioned so that the light ray LB is continuously coupled successively into the other light waveguides LW2 through LWn to be investigated. The diaphragm means BLV can be operated with the assistance of an actuator device BV3 with a control signal DS10 on a control line DL10. The drive of the actuation means BV3 occurs with the assistance of the drive mechanism ASV4 that communicates a signal DS9 to the actuating means BV3 on a line DL9.

The diaphragm means BLV can also be advantageously constructed in the form of a movable disc that comprises an admission slot and can be turned into a suitable infeed position, for example a chopper disc. It is also possible to provide an electro-optical diaphragm instead of a mechanical diaphragm or, respectively, aperture in a diaphragm means BLV. What is referred to as a liquid crystal shutter, which is offered by Displaytech Incorporated of Boulder, Colo., is particularly suited for this purpose.

The optical transmission characteristics of a plurality of light waveguides can be selectively identified with high precision and sensitivity in a simple way upon simultaneous reduction of the measuring time per light waveguide with the inventive measuring instrument according to FIGS. 1 and 2, and its modified optical transmitter according to FIGS. 3 through 5. For an exact, selective measurement according to FIGS. 1 and 2, the plurality m of transmission elements is expediently at least equal to 1, but is preferably to be selected between 2 and 5 times as large as the plurality of light waveguides to be measured. The best case for the selective light infeed at the transmission side into the light waveguides to be measured occurs from the optical transmission coupling devices or, respectively, transmitters of FIGS. 3 through 5. A respective light ray therein respectively continuously sweeps the light waveguides to be measured so that the intensity distribution in the light waveguides to be measured can be likewise continuously registered and, thus, can be measured with particular exactness.

In FIGS. 1 through 5, the width of the luminous spot incident onto the ribbon conductor can also be selected so small that light is not coupled into the core of an optical fiber in every position.

The exemplary embodiments of FIGS. 1 through 5 referred to by way of example to the application of the invention given light waveguide ribbons. Of course, it is also possible to selectively identify the optical transmission quantities of a plurality of light waveguides with the measuring apparatus of the invention that can be provided loosely bundled or bundled in some other way. It is thereby of no significance whether the light waveguides to be measured are arbitrarily arranged or are arranged in an ordered structure, as long as they do not mutually occlude one another.

It is also possible to apply the measuring apparatus of the invention according to FIGS. 1 through 5 or, respectively, the appertaining measuring method in the transmission-side infeed of the test signals into the open, freely accessible end faces of light waveguides to be measured. The flexural coupler BK1 in the optical transmitters OT1 through OT5 according to FIGS. 1 through 5 is then eliminated. For example, the transmission radiation field TF0 through TFn of FIG. 2 are then directly supplied into the open ends of the light waveguides LW1 through LWn of FIG. 1. These open end faces then, for example, lie in FIG. 1 where the right-hand edge of the dot-dash boundary having reference character OT1 intersects the connecting lines of the light waveguides LW1 through LWn, i.e., the ribbon BL1 across the width.

Although various minor modifications may be suggested by those versed in the art, it should be understood that we wish to embody within the scope of the patent granted hereon all such modifications as reasonably and properly come within the scope of our contribution to the art.

We claim:

1. In an apparatus for measurement of a plurality of light waveguides, said apparatus comprising an optical transmitter means for creating an optical signal being coupled via a first coupling device on a transmission side into the light waveguides to be measured, optical receiver means for receiving the signal being decoupled via a second coupling device on a reception side from each waveguide by at least one reception element connected to an evaluation means, the improvements comprising the first coupling device on the transmission side including a flexural coupler on which the waveguides to be measured are guided in a curved path to form a freely-selectable, arcuate infeed section for each waveguide to be measured, the optical transmitter means providing a separately distinguishable transmission radiation field of said coupled signal to a coupling region of said flexural coupler with a luminous spot of the transmission radiation field being respectively distinguishably coupled into each light waveguide to be measured at a respective arcuate infeed section, the second coupling device on the reception side including a second flexural coupler on which each waveguide to be measured is guided in a curved path to form a freely-selectable, arcuate outfeed section coupling out a reception radiation field of said decoupled signal from each waveguide to be measured, the reception element being aligned to receive the radiation field leaving each of the light waveguides to be measured and generating distinguishable measuring signals therefrom and the evaluation means receiving the measuring signals and separately evaluating each of the measuring signals received from the reception element.

2. In an apparatus according to claim 1, wherein the light waveguides are mechanically connected to one another to form a ribbon conductor.

3. In an apparatus according to claim 1, wherein the light waveguides are arbitrarily arranged in the coupling region 4. In an apparatus according to claim 1, wherein the optical transmitter means comprises a plurality of transmission elements that is smaller than the number of light waveguides to be measured.

5. In an apparatus according to claim 1, wherein the optical transmitter means includes a separate transmission element allocated to each light waveguide to be measured.

6. In an apparatus according to claim 1, wherein the optical transmitter means includes a plurality of transmission elements, with the number of transmission elements being greater than the number of light waveguides so that more than one transmission element is allocated to each of the waveguides in the coupling region.

7. In an apparatus according to claim 1, wherein the optical transmitter means includes a plurality of transmission elements arranged in a structure selected from a line structure and an array structure.

8. In an apparatus according to claim 1, wherein the optical transmitter means includes means for directing a luminous spot into the light waveguides in chronological succession along the respective infeed section of the light waveguides to be measured.

9. In an apparatus according to claim 8, wherein the means for directing includes a plurality of transmission elements and drive means for actuating the transmission elements in a time-division multiplex manner.

10. In an apparatus according to claim 8, wherein the optical transmitter means includes at least one infeed means and wherein the means for directing sweeps the transmission radiation field of at least one transmission element respectively along the infeed sections of the light waveguides in the coupling region in chronological succession.

11. In an apparatus according to claim 8, wherein the means for directing includes a beam deflecting means being provided for providing the motion of the transmission radiation field.

12. In an apparatus according to claim 11, wherein the beam deflecting means is a movable mirror.

13. In an apparatus according to claim 11, wherein the beam deflecting means comprises an acousto-electro-optical means.

14. In an apparatus according to claim 8, wherein the means for directing includes an actuation device for moving at least one transmission element relative to the light waveguides to respectively illuminate the light waveguides in chronological succession.

15. In an apparatus according to claim 8, wherein the optical transmitter means includes a light source having a transmission radiation field and said means for directing includes diaphragm means being arranged in said transmission radiation field, said diaphragm means comprising an aperture to allow transmission of a part of the radiation field to pass therethrough, said aperture being movable to enable projecting light in successive order on the light waveguides in chronological manner.

16. In an apparatus according to claim 15, wherein the diaphragm means includes a mechanically movable transmission slot as the aperture.

17. In an apparatus according to claim 15, wherein the diaphragm means includes an electro-optical aperture.

18. In an apparatus according to claim 1, wherein the optical transmitter means has different transmission radiation fields from a plurality of transmission elements being simultaneously coupled into the infeed sections of the light waveguides to be measured.

19. In an apparatus according to claim 18, wherein the optical transmitter means includes modulating means for generating distinguishable transmission radiation fields.

20. In an apparatus according to claim 1, wherein the optical transmitter means includes imaging optics being arranged in the coupling region between a transmission element of the transmitter means and the light waveguides to be measured.

21. In an apparatus according to claim 1, wherein the optical transmitter means includes means forming luminous spots having an expanse along the respective infeed sections of the light waveguides of at least half the thickness of the light waveguide ribbon.

22. In an apparatus according to claim 1, wherein the optical transmitter means has means producing a luminous spot having a width in the coupling region along the infeed sections of the light waveguides to be measured corresponding, at most, to the spacing between the axes of neighboring light waveguides.

23. In an apparatus according to claim 1, wherein the optical transmitter means has light emitting diodes provided with transmission elements.

24. In an apparatus according to claim 1, wherein the optical transmitter means has a laser as a transmission element.

25. In an apparatus according to claim 1, wherein the optical transmitter means has a plurality of transmission elements, and lateral diaphragms being provided between said transmission elements in order to separate the radiation field of neighboring transmission elements.

26. In an apparatus according to claim 1, which includes a multiple splicing means, said multiple splicing means having adjustment means for alignment of the light waveguides and said multiple splicing means.

27. In an apparatus according to claim 26, wherein the evaluation means includes a measured value memory, a central processor unit, said central processor unit receiving signals from the reception element and actuating the adjustment means of the multiple splicing means in response to the received signals.

28. In an apparatus according to claim 1, wherein the evaluation means includes a display means for illustrating the measured signals.

29. In an apparatus according to claim 1, which includes a light waveguide splicing arrangement.

30. In an apparatus according to claim 1, which includes a light waveguide attenuation measuring means.

31. In a method for measurement of a plurality of light waveguides, said method comprising creating an optical signal and coupling the signal on a transmission side into the light waveguides to be measured, decoupling the signal on a reception side from each waveguide and evaluating the decoupled signal, the improvements comprising the step of coupling on the transmission side including placing the waveguides to be measured around a flexural coupler and guiding each waveguide in a curved path to form a freely-selectable, arcuate infeed section for each waveguide to be measured, transmitting a separately distinguishable transmission radiation field of said coupled signal to a coupling region of said flexural coupler with a luminous spot of the transmission radiation field being respectively distinguishably coupled into each light waveguide to be measured at the respective arcuate infeed section, the step of decoupling on the reception side including placing each waveguide to be measured around a second flexural coupler and guiding each waveguide in a curved path to form a freely-selectable, arcuate outfeed section for coupling out a reception radiation field of said decoupled signal from each waveguide to be measured, aligning a reception element to receive the radiation field leaving each of the light waveguides to be measured and to generate distinguishable measuring signals therefrom and separately evaluating each of the measuring signals received.

32. In a method according to claim 31, wherein the step of coupling the light into the waveguides couples the light in chronological succession and said step of decoupling maintains the chronological separation of the light.

33. In a method according to claim 31, wherein the step of coupling the light maintains a separation of the light by modulating different signals and coupling them into each of the different waveguides.

34. In a method according to claim 33, wherein each of the transmission radiation fields are simultaneously fed into the light waveguides to be measured.

35. In a method according to claim 31, wherein the step of coupling separates radiation transmission fields for each of the waveguides includes providing transmission radiation fields having different frequencies for each of the waveguides.

* * * * *